United States Patent
Cremer

(10) Patent No.: US 6,870,980 B2
(45) Date of Patent: Mar. 22, 2005

(54) RAMAN AMPLIFIER SYSTEM

(75) Inventor: Cornelius Cremer, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/221,899

(22) PCT Filed: Feb. 6, 2001

(86) PCT No.: PCT/DE01/00446

§ 371 (c)(1),
(2), (4) Date: Aug. 4, 2003

(87) PCT Pub. No.: WO01/69821

PCT Pub. Date: Sep. 20, 2001

(65) Prior Publication Data

US 2004/0028358 A1 Feb. 12, 2004

(30) Foreign Application Priority Data

Mar. 16, 2000 (DE) .......................... 100 12 881

(51) Int. Cl.$^7$ ............... G02B 6/26; G02B 6/02; H01S 3/00; H01S 3/30
(52) U.S. Cl. .............. 385/15; 385/123; 359/334; 372/6
(58) Field of Search .................. 385/15, 123; 359/334, 359/341; 372/6

(56) References Cited

U.S. PATENT DOCUMENTS 6,366,729 B1 * 4/2002 Brandon et al. ............ 385/123
6,490,077 B1 * 12/2002 Conradi ..................... 359/334

FOREIGN PATENT DOCUMENTS

EP          0708538      4/1996
WO       WO 99/57822    11/1999

OTHER PUBLICATIONS

Kato et al., "Ultra–low nonlinearity low–loss pure silica core fibre for long–haul WDM transmission" Sep. 16, 1999, pp. 1615–1617.
Okuno et al, "Silica–based functional fibers with enhanced nonlinearity and their applications" Sep.–Oct. 1999, pp. 1385–1391.
Brandon et al., "Raman limited, truly unrepeatered transmission at 2.5 Gbit/s over 453 km with +30 dBm launch signal power", Sep. 20–24, 1998, pp. 563–564.

* cited by examiner

Primary Examiner—John D. Lee
Assistant Examiner—Tina M Lin
(74) Attorney, Agent, or Firm—Bell Boyd & Lloyd LLC

(57) ABSTRACT

A Raman amplifier system is provided for amplifying optical signals that are transmitted via a transmission medium, the series circuit being composed of a standard single-mode fiber arranged on a transmit side, and a second optical fiber arranged on a receive side.

4 Claims, 1 Drawing Sheet and which accidentally arise during the production of optical standard single-mode fibers. The optical signal to be transmitted is scattered into different directions as a result of the arising local modifications of the refractive index caused by such density fluctuations. Given a Raman amplification that is too high, i.e. (a Raman pump capacity that is too high), the "Amplified Spontaneous Emission" (ASE) (i.e., the optical noise added to the optical signal or, respectively, data signal, of the optical Raman amplifier) is increased such that an independent oscillation of the Raman signal is stimulated in the transmission fiber, whereby this effect is amplified significantly greater, with respect to a Raman amplification, than the Rayleigh scattering reflex is additionally amplified.

RAMAN AMPLIFIER SYSTEM

BACKGROUND OF THE INVENTION

The present invention is directed to a Raman amplifier system for amplifying optical signals that are transmitted via a transmission medium.

In present and future optical transmission systems, particularly with respect to transmission systems operating according to the WDM principle (Wavelength Division Multiplexing), a pump wave inserts optical pump signals into an optical standard single-mode fiber in order to provide the necessary optical pump power for optical amplifiers preceding the launching location; for example, erbium amplifiers. Furthermore, such optical pump signals are used for directly amplifying optical signals to be transmitted, whereby the optical amplification caused by the optical pump signals is based on the Raman effect. For example, the Raman effect ("Stimulated Raman Scattering") is described in "Nonlinear Fiber Optics" by Govind P. Agrawal, Academic Press, 1995, see pages 316 to 322.

The Raman preamplifier is known as a specific embodiment for the use of the Raman effect for optical amplification problems; for example, see "Raman limited, truly unrepeated transmission ad 2.5 Gbit/s over 453 km with +30 dBm launched signal power", E. Brandon, J.-P. Blondel, pages 563 to 564, ECOC98, 20–24. September 1998, Madrid, Spain or see Govind P. Agrawal, "Nonlinear Fiber Optics", Academic Press, 1995, pages 356 to 359.

A powerful optical pump signal, immediately before the optical reception device of an optical transmission path, is launched into the optical fiber, whereby the optical pump signal, contrary to the optical data signal, expands in the optical transmission medium or, respectively, in the optical fiber. On the basis of the Raman effect, one Stokes' wave or, respectively, a number of Stokes' waves is or, respectively, are generated in the optical fiber for this powerful optical pump signal, whereby the Stokes' waves are dependent on the wavelength of the pump signal and which amplify different optical signal waves or, respectively, optical signals having different wavelengths in different types of fibers. Given previously known Raman preamplifiers, optical pump signals having wavelengths of approximately 1450 to 1460 nm normally are used in order to effectively preamplify optical signals or, respectively, data signals having wavelengths of 1550 to 1560 nm, whereby the first Stokes' wave is used for preamplifying the first optical signal. As a result, the transmission length of an optical transmission path, which can be bridged in a regeneration-free manner, can be significantly extended, so that an enormous economical advantage is obtained given the realization of an optical transmission path with the assistance of an optical deep-sea cable. An even greater overall transmission length of the optical transmission path can be achieved the further remote from the launching location of the optical pump signal an optimally high pump capacity or, respectively, Raman preamplification can be generated by the Raman effect, whereby the overall transmission length can be bridged in a regeneration-free manner.

The maximum Raman amplification is limited by the loss of reflection of the Rayleigh scattering in the transmission fiber. The Rayleigh scattering is caused in optical standard single-mode fibers by density fluctuations as a result of fiber impurities which accidentally arise during the production of optical standard single-mode fibers. The optical signal to be transmitted is scattered into different directions as a result of Therefore, the maximum optical Raman pump capacity launched into the optical fiber is kept correspondingly low with respect to existing optical transmission systems or, respectively, Raman amplifier arrangements, in order to prevent such oscillation. Furthermore, the effective noise factor of the Raman amplifier arrangement, which can be obtained, is limited given the use of Raman pump capacities of less than 1 Watt, see Govind P. Agrawal, "Nonlinear Fiber Optics", Academic Press, pages 477–480, whereby the optical signal-to-noise ratio (OSNR) of the optical data signal is additionally reduced as a result.

Furthermore, the publication "Ultra Low Nonlinearity Low Loss Pure Silica Core Fiber for Long Haul WDM-Transmission" by T. Kato et al., Electronic Letters, vol. 35, no. 19, p. 1615–1617, September 1999 discloses optical fibers having a fiber cross-section of more than 110 $\mu m^2$ and a low damping constant of 0.17 dB/km given a signal wavelength of 1550 nm, whereby the optical fibers have a nonlinearity coefficient which is reduced by 30% compared to traditional optical standard single-mode fibers and which therefore enable an almost distortionfree transmission of optical signals via distances of a few hundred kilometers.

An object of the present invention is to optimize the amplification of optical signals by using the Raman effect.

SUMMARY OF THE INVENTION

A key aspect of the inventive Raman amplifier arrangement is that a series circuit is provided as an optical transmission medium, whereby the series circuit is composed of a standard single-mode fiber, which is arranged on the transmit side, of a first optical fiber and of a second optical fiber, which is arranged on the receive side, whereby an optical pump signal is launched into the second optical fiber on the receive side in order to generate the Raman effect in the first optical fiber and the first optical fiber has an effective fiber cross-section of less than 60 $\mu m^2$ and a nonlinearity constant of more than $1*10^1$ 1/W and the second optical fiber has an effective fiber cross-section of more than 100 $\mu m^2$ and a nonlinearity constant of less than $1*10^{-8}$ 1/W. As a result of the inventively high effective cross-section of more than 100 $\mu m^2$ and the low nonlinearity constant of less than $1*10^{-8}$ 1/W of the second optical fiber, the optical pump light, with a relatively insignificant damping loss (approx. 3 dB), can be transmitted to the first optical fiber in which an amplification of the optical data signal can be purposefully carried out with the assistance of the produced Raman effect. Therefore, the amplification point can be selected further remote from the receiver (approx. >80 km), so that the optical transmission path, which can be bridged in a regeneration-free manner, is inventively increased; i.e., the optical signal, which is transmitted via the inventively shortened optical standard single-mode fiber (therefore, less strongly attenuated), is already amplified in an amplification point that is arranged further remote from the receiver. In addition, the influence of the height of the noise of the ASE, compared to the amplitude of the data signal in the amplification point, is less as a result of the less strongly attenuated data signal, so that the effective noise factor of the Raman amplifier system is improved.

Another advantage of the inventive Raman amplifier system is that the first and second optical fiber have a Rayleigh scattering coefficient of less than −33 dB and a fiber attenuation of less than 0.3 dB/km given the respectively provided pump wavelength.

Due to the low fiber attenuation and the low Rayleigh scattering coefficient, high pumping capacities (approx. >1 watt) can be launched into the optical transmission medium without generating disturbing oscillations of the pump signal in the transmission medium.

Additional features and advantages of the present invention are described in, and will be apparent from, the following Detailed Description of the Invention and the Figures.

BRIEF DESCRIPTION OF THE FIGURES

As an example.

DETAILED DESCRIPTION OF THE INVENTION

Figure 1:
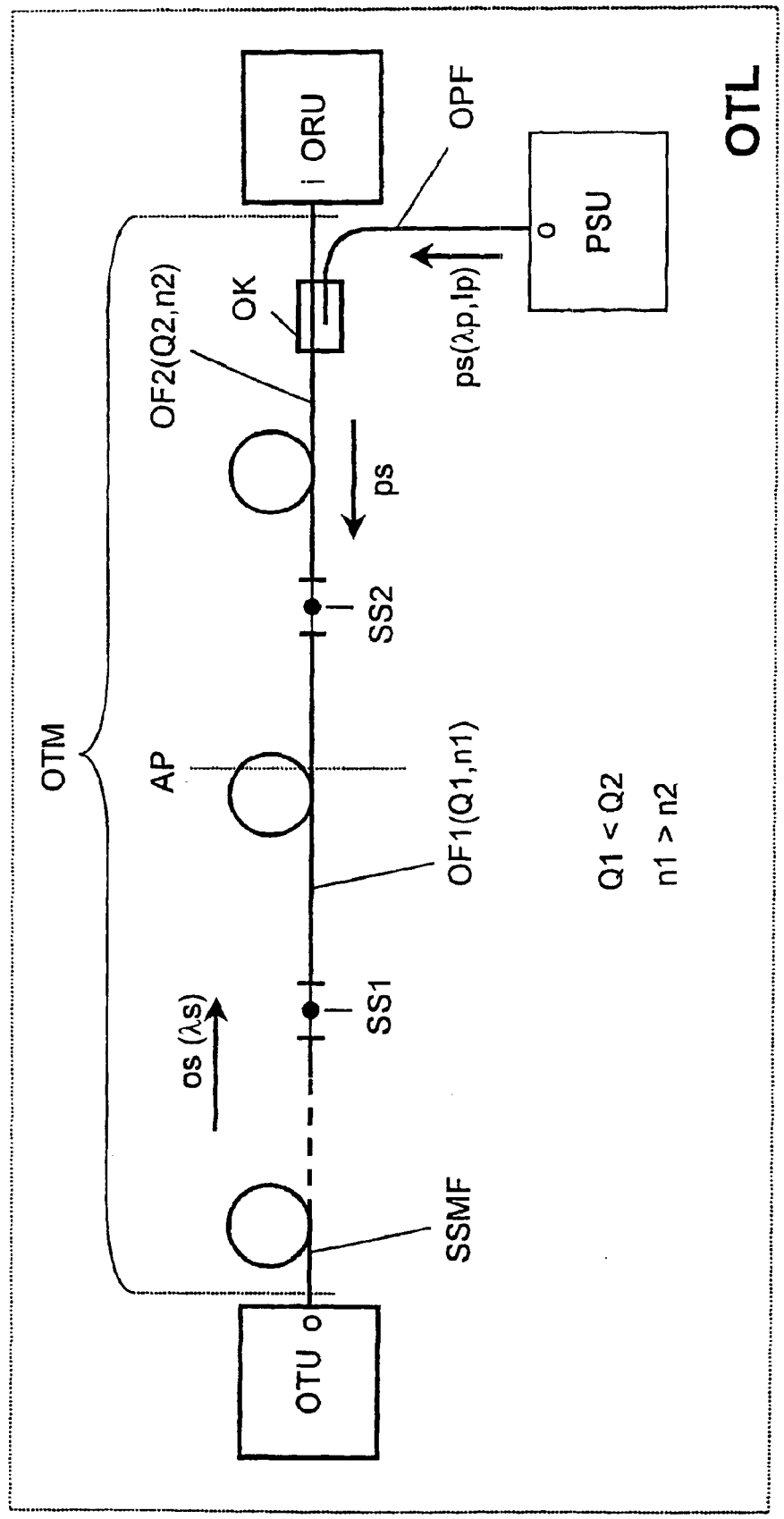
FIG. 1 shows the schematic structure of the inventive Raman amplifier system for amplifying optical signals.

For example, FIG. 1 shows an optical transmission path OTL having an optical transmission unit OTU and an optical reception unit ORU, whereby an output o of the optical transmission unit OTU, via an optical standard single-mode fiber SSMF, a first optical fiber OF1 and second optical fiber OF2 and an optical coupler OK, is connected to an input i of the optical reception unit ORU. FIG. 1 refers to the transmission locations between the optical standard single-mode fiber SSMF and the first optical fiber OF1 or, respectively, between the first optical fiber OF1 and the second optical fiber OF2 as a first splice location SS1 or, respectively, second splice location SS2. Furthermore, the optical coupler OK, via an optical pump fiber OPF, is connected to a pump signal unit PSU having an output o. The optical transmission medium OTM is inventively composed of a series circuit of the optical standard single-mode fiber SSMF, the first optical fiber OF1, and the second optical fiber OF2.

The first optical fiber OF1 inventively has a first effective fiber cross-section Q1 of less than 60 $\mu m^2$ and a nonlinearity constant n1 of more than $1*10^1$ 1/w and the second optical fiber OF2 has a second effective fiber cross-section of more than 100 $\mu m^2$ and a second nonlinearity constant n2 of less than $1*10^{-8}$ 1/W; i.e., the first effective fiber cross-section Q1 is smaller than the second effective fiber cross-section Q2 and the first nonlinearity constant n1 is greater than the second nonlinearity constant n2. In addition, the first optical fiber OF1 and the second optical fiber OF2 have a Rayleigh scattering coefficient of less than −33 dB, for example, and have a fiber attenuation of less than 0.3 dB/km given the respectively provided pump wavelength $\lambda_p$, for example 1450 nm.

As shown in FIG. 1, an optical data signal or, respectively, signal os having a wavelength $\lambda s$, for example 1550 nm, is generated by the optical transmission unit OTU, is outputted at the output o and subsequently is launched into the optical standard single-mode fiber SSMF. Subsequently, the optical signal os ($\lambda s$), from the output o of the optical transmission unit OTU, is transmitted to the input i of the optical reception unit ORU via the optical standard single-mode fiber SSMF, via the first optical fiber OF1, via the second optical fiber OF2 and via the optical coupler OK, whereby the distance, perhaps several hundred kilometers, between the optical transmission unit OUT and reception unit ORU, which is present regarding previously realized optical transmission paths OTL, is indicated by the optical standard single-mode fiber SSMF shown in broken lines. A dotted line exemplarily indicates the amplification point AP or, respectively, the section of the first optical fiber OF1, whereby the optical signal os ($\lambda s$) is to be amplified at the amplification point AP or, respectively, in the section of the first optical fiber OF1 in order to assure a further low-loss transmission of the optical signal os to the optical reception unit ORU or, respectively, in order to be able to regain the optical signal os at the input i of the optical reception unit ORU.

In the optical pump signal unit PSU, an optical pump signal ps is generated with a previously determined pump wavelength $\lambda p$ and a pump intensity Ip and is transmitted, from the output o of the pump signal unit PSU, to the optical coupler via the optical pump fiber OPF. The optical pump signal ps, with the assistance of the optical coupler OK, is launched into the second optical fiber OF and expands from the second to the first optical fiber OF1, OF2 opposite to the transmission direction of the optical signal os. The optical pump signal ps initiates the Raman effect in the first optical fiber OF1 (i.e., a Raman line spectrum) or, respectively, a number of Stokesy' waves of different wavelength arise in the first optical fiber OF, whereby the optical signal, os is purposefully amplified, by the Raman line spectrum or, respectively, a number of Stokes' waves of different wavelength, in the first optical fiber at an amplification point AP. As a result of the low fiber attenuation in the first optical fiber OF1 and in the second optical fiber OF2 and as a result of the respectively low Rayleigh scattering coefficients, high pump capacities (approx. >1 watt) can be inventively launched into the optical transmission medium OTM without disturbing oscillations being caused in the transmission medium by inserted pump signals ps.

On the basis of the second high effective fiber cross-section Q2 of over 100 $\mu m^2$, for example, and the low first nonlinearity constant of $1*10^{-8}$ 1/W, the optical pump signal ps in the second optical fiber OF2 is inventively transmitted to the first optical fiber OF1 with only a slight attenuation loss (approx. 3 dB). In the first optical fiber OF1, an effective amplification of the optical data signal os can be purposefully carried out with the assistance of the Raman effect produced in the first optical fiber OF1 by pumping with the optical pump signal ps. Therefore, the amplification point AP can be selected further remote from the optical reception unit ORU (approx. >80 km), so that the optical transmission path, which can be bridged in a regeneration-free manner, is inventively increased; i.e., the optical signal os, which is transmitted via the inventively shortened optical standard single-mode fiber SSMF and which, therefore, is less strongly attenuated, is preamplified in an amplification point AP that is arranged further remote from the optical reception unit ORU. In addition, the influence of the height of the noise of the ASE, compared to the amplitude of the data signal in the amplification point, is less as a result of the less strongly attenuated data signal, so that the effective noise factor of the Raman amplifier system is improved.

Possibly, a number of optical pump signals ps having different pump wavelengths $\lambda_p$ can be generated in the pump signal unit PSU and can be launched into the second optical fiber OF2 via the optical pump fiber OPF and the optical coupler OK (not shown in FIG. 1). Therefore, the Raman line spectrum can be formed by which a number of optical data signals or, respectively, optical transmission signals os transmitted in different optical channels and/or optical frequency bands can be effectively amplified.

The inventive Raman amplification arrangement is not limited to WDM transmission systems but can be used for amplifying optical signals OS with respect to arbitrary optical transmission paths OTL.

Indeed, although the present invention has been described with reference to specific embodiments, those of skill in the art will recognize that changes may be made thereto without departing from the spirit and scope of the present invention as set forth in the hereafter appended claims.

What is claimed is:

1. A Raman amplifier system for amplifying optical signals transmitted via an optical transmission medium, wherein a series circuit is provided as the optical transmission medium, the series circuit comprising:

a standard single-mode fiber located on a transmit side;

a first optical fiber having an effective fiber cross-section of less than 60 $\mu m^2$ and a nonlinearity constant of more than $1*10^1$ 1/W;

a second optical fiber located on a receive side having an effective fiber cross-section of more than 100 $\mu m2$ and a nonlinearity constant of less than $1*10^{-8}$ 1/W;

wherein an optical pump signal is launched into the second optical fiber on the receive side to produce a Raman effect in the first optical fiber.

2. A Raman amplifier system for amplifying optical signals as claimed in claim 1, wherein the first optical fiber and the second optical fiber have a Rayleigh scattering coefficient of less than −33 dB and a fiber damping of less than 0.3 dB/km given the Raman pump wavelength.

3. A Raman amplifier system for amplifying optical signals as claimed in claim 1, further comprising an optical coupling unit for launching the optical pump signal, which is generated in an optical pump signal unit, into the second optical fiber.

4. A Raman amplifier system for amplifying optical signals as claimed in claim 1, wherein the second optical fiber has a length in a range from 30 to 80 km dependent on an attenuation of the optical pump signal.

* * * * *